Feb. 10, 1970 R. Y. MOSS II 3,495,179
AMPLIFIER OVERLOAD INDICATOR
Filed June 23, 1966
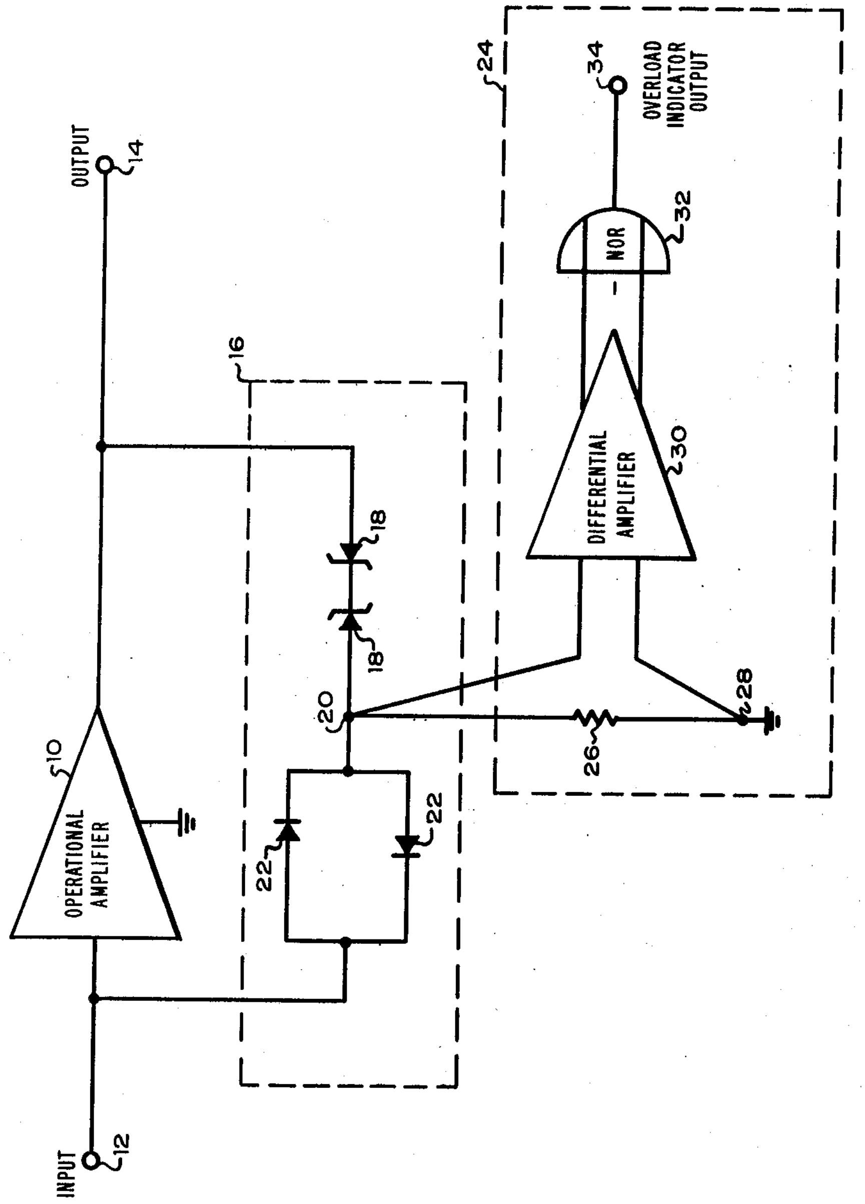
INVENTOR
RICHARD Y. MOSS, II
BY Roland D. Griffin
ATTORNEY

1

3,495,179

AMPLIFIER OVERLOAD INDICATOR

Richard Y. Moss II, Los Altos, Calif., assignor to Hewlett-Packard Company, Palo Alto, Calif., a corporation of California Filed June 23, 1966, Ser. No. 559,848
Int. Cl. G01r *19/00, 21/00*
U.S. Cl. 330—2 2 Claims

ABSTRACT OF THE DISCLOSURE

A directly-coupled nonlinear feedback network including two pairs of diodes is connected between the output and the input of an operational amplifier for reducing the gain of the operational amplifier in response to input signals having a magnitude exceeding a threshold overload value. A directly-coupled overload indicator including a differential amplifier and a NOR gate is connected to the nonlinear feedback network at a point between the two pairs of diodes for producing a signal continuously indicating feedback or feedforward operation of the nonlinear feedback network.

This invention relates to apparatus for detecting and signalling the non-linear operation and, more particularly, the overloading of an operational amplifier. An operational amplifier is hereinafter defined as any D.C. coupled amplifier having at least one inverting input and a sufficiently small phase shift to prevent undesired oscillations at all operating frequencies where the voltage gain is greater than one.

A non-linear feedback network may be employed to protect an operational amplifier from the harmful effects of overloading by reducing the gain of the operational amplifier for input signals having an amplitude greater than a critical overload value. However, in many applications it is also important to provide an indication of such gain reduction since the relationship of output signal to input signal is changed by operation of the non-linear feedback network. Accordingly, it is the principal object of this invention to provide a circuit for detecting and signalling non-linear feedback in an operational amplifier.

There are other conditions besides overloading which may cause an operational amplifier to operate in a non-linear manner. For example, such non-linear operation may be caused by a shorted output or undesirable oscillations. Thus, it is a more general object of this invention to provide a circuit for detecting and signalling non-linear operation of an operational amplifier having a non-linear feedback network.

These objects are accomplished according to the illustrated embodiment of this invention by providing an operational amplifier with a non-linear feedback network including a sense point at which a feedback signal appears when the feedback network is rendered operative, for example, to protect the operational amplifier from the harmful effects of overloading. A feedforward sense point signal appears when the operational amplifier is operating in a non-linear manner because its output is shorted. Bipolar sensing means including a differential amplifier and a logical NOR circuit are responsive to the presence of a sense point signal of positive or negative polarity for producing a signal indicating overloading of the operational amplifier or such non-linear operation as is caused by a shorted output.

Other and incidental objects of this invention will become apparent from a reading of this specification and an inspection of the accompanying drawing which shows an operational amplifier overload indicator according to the preferred embodiment of this invention.

2

Referring now to the drawing, there is shown an operational amplifier 10 having an input 12 and an output 14. A non-linear feedback network 16 connects the output 14 to the input 12 for reducing the gain of the operational amplifier 10 to protect the operational amplifier against the overloading effects of excessively large signals of positive or negative polarity. This non-linear feedback network 16 comprises a pair of serially connected and oppositely poled avalanche effect diodes 18, such as Zener diodes which connect the output 14 to a sense point 20. It further comprises a pair of parallel connected and oppositely poled diodes 22 connecting the sense point 20 to the input 12. The non-linear feedback network 16 is normally inoperative for input voltage signals of either polarity when they have an amplitude less than a critical value, but is operative to reduce the gain of the operational amplifier by providing as much as one hundred percent feedback for input voltage signals having an amplitude greater than this critical value. This critical value is the input voltage amplitude at which both of the avalanche effect diodes 18 and one of the diodes 22 are rendered conductive. Thus, for an input voltage of given polarity having an amplitude which exceeds the critical value, one of the avalanche diodes 18 operates in the avalanche region of its electrical characteristic and the other avalanche diode 18 and one of the diodes 20 operate in the forward conduction regions of their electrical characteristics. By appropriately selecting the diodes 18 and 22 the critical value can be made less than or equal to the threshold input voltage amplitude at which the operational amplifier is driven into an overloaded condition. The feedback network 16 is therefore operative to provide a feedback signal at the sense point 20 for input voltage signals which may overload the operational amplifier 10.

Bipolar sensing means 24 are connected to the sense point 20 for detecting the presence of a sense point signal of positive or negative polarity. This sensing means 24 comprises a resistor 26 connecting the sense point 20 to a point 28 of ground potential. The input of a differential amplifier 30 having a pair of outputs of opposite phase is connected across this resistor 26 for making the differential amplifier responsive to the presence of a feedback sense point signal of one polarity to produce a negative signal at one of its outputs and a positive signal at the other of its outputs and responsive to the presence of a feedback sense point signal of opposite polarity to reverse this signal condition at its outputs. A logical NOR circuit 32 is connected to the outputs of the differential amplifier 30 for providing a positive overload signal at its output terminal 34 whenever a negative signal is provided at either of the outputs of the differential amplifier. This overload signal indicates that the input voltage signal applied to the operational amplifier 10 exceeds the critical value and that the relationship of output signal to input signal is therefore changed by operation of the non-linear feedback network 16.

Non-linear operation of the operational amplifier 10 due to causes other than overloading may also provide a sense point signal. For example, feedforward signals are provided at the sense point 20 when the output of the operational amplifier 10 is shorted. The bipolar sensing means 24 is responsive to all of these sense point signals for producing positive output signals indicating non-linear operation of the operational amplifier 10.

I claim:

1. In combination an operational amplifier having an input and an output; a directly coupled non-linear feedback circuit connected between said output and said input for conducting a DC feedback signal therebetween to reduce the gain of said amplifier, said feedback circuit including first and second serially connected unidirectional conducting means poled for making it operative to conduct the DC feedback signal only in response to the application of an input signal having an amplitude greater than a selected threshold value to said input; and a directly coupled sensing circuit connected to said feedback circuit between said first and second unidirectional conducting means, said sensing circuit comprising a resistive element connected between a point of reference potential and a point in said feedback circuit between said first and second unidirectional conducting means, a differential amplifier having a pair of input terminals and a pair of output terminals, means for connecting said pair of input terminals across said resistive element to make said differential amplifier responsive to a feedback signal of either polarity for providing an output signal of one polarity at one of said pair of output terminals, and a logic circuit connected to said pair of output terminals and responsive to the output signal of one polarity to provide an indicating signal during operation of said feedback circuit.

2. The combination of claim 1 wherein said first unidirectional conducting means comprises a first pair of serially connected and oppositely poled avalanche effect diodes; said second unidirectional conducting means comprises a second pair of parallel connected and oppositely poled diodes; said first and second pairs of diodes being serially connected between said output and said input for making said feedback circuit operative to conduct DC feedback signals of opposite polarities in response to the application of input signals of opposite polarities with amplitudes in excess of the selected threshold value to said input.

References Cited

UNITED STATES PATENTS

| | | | |
|---|---|---|---|
| 3,094,670 | 6/1963 | Batchelor | 330—2 |
| 3,112,449 | 11/1963 | Miller | 328—26 |
| 3,153,152 | 10/1964 | Hoffman | 330—110 X |

NATHAN KAUFMAN, Primary Examiner

U.S. Cl. X.R.

330—24, 26, 110